(12) United States Patent
Sherman et al.

(10) Patent No.: US 10,150,583 B2
(45) Date of Patent: Dec. 11, 2018

(54) POUR TRAY

(71) Applicant: Beyond Zero, Inc., Louisville, KY (US)

(72) Inventors: Jason S. Sherman, Louisville, KY (US); D. Paul Haviland, Louisville, KY (US); Steven Wiseman, Georgetown, IN (US)

(73) Assignee: Beyond Zero, Inc., Louisville, KY (US)

( * ) Notice: Subject to any disclaimer, the term of this patent is extended or adjusted under 35 U.S.C. 154(b) by 0 days.

(21) Appl. No.: 15/584,701

(22) Filed: May 2, 2017

(65) Prior Publication Data

US 2017/0320613 A1    Nov. 9, 2017

Related U.S. Application Data

(60) Provisional application No. 62/331,128, filed on May 3, 2016.

(51) Int. Cl.
  *B65B 3/06*     (2006.01)
  *B65D 1/36*     (2006.01)
  *G01F 19/00*    (2006.01)

(52) U.S. Cl.
  CPC .............. *B65B 3/06* (2013.01); *B65D 1/36* (2013.01); *G01F 19/00* (2013.01)

(58) Field of Classification Search
  CPC . B65D 1/34; B65D 1/36; B65D 5/503; B65D 7/06; B65D 7/065; B65D 7/08; B65D 43/02; B65D 81/261; B65D 81/3294; B65D 2501/24; B65B 3/06

USPC ........................................................ D9/456
  See application file for complete search history.

(56) References Cited

U.S. PATENT DOCUMENTS

| | | | | |
|---|---|---|---|---|
| 2,268,457 A | * | 12/1941 | Moore | G03D 13/04 396/642 |
| 2,594,127 A | * | 4/1952 | Collier | F25C 1/24 206/508 |
| 3,071,933 A | * | 1/1963 | Shoemaker | F25C 1/04 249/127 |
| 3,122,898 A | * | 3/1964 | Kniffin | F25C 1/24 249/127 |
| 3,154,225 A | * | 10/1964 | Wadlinger | B65D 77/206 222/485 |
| 3,436,231 A | * | 4/1969 | Britt | B65D 1/34 229/406 |
| 3,866,817 A | * | 2/1975 | Holden, Jr. | B65D 1/34 206/521.1 |
| D244,581 S | * | 6/1977 | Keough | D9/456 |
| 4,216,552 A | * | 8/1980 | Gurolnick | A47K 3/034 4/548 |
| 4,462,496 A | * | 7/1984 | Stafford | B07C 5/04 209/614 |

(Continued)

*Primary Examiner* — Patrick M Buechner
(74) *Attorney, Agent, or Firm* — Christopher & Weisberg, P.A.

(57) ABSTRACT

A liquid pour tray provides a plurality of liquid retaining receptacles each having a proximal portion and a distal portion defining an open end, the distal portion having a width narrowing in a direction opposite the proximal portion toward the open end. A plurality of partitions are interposed between the plurality of liquid retaining receptacles and an overflow reservoir is in fluid communication with the plurality of liquid retaining receptacles.

20 Claims, 4 Drawing Sheets

(56) References Cited

U.S. PATENT DOCUMENTS

| | | | | |
|---|---|---|---|---|
| 4,643,316 | A | * | 2/1987 | Hoffmann ............... B07C 7/04 206/373 |
| RE32,806 | E | * | 12/1988 | Gurolnick ............. A47K 3/034 4/572.1 |
| 5,117,982 | A | * | 6/1992 | Shotthafer ............ B07C 7/02 141/331 |
| 5,636,743 | A | * | 6/1997 | Dalbo .................. B65D 85/58 206/564 |
| 6,196,426 | B1 | * | 3/2001 | White .................... A61J 7/02 222/462 |
| 6,467,622 | B1 | * | 10/2002 | Hull ..................... B65D 1/36 206/553 |
| 9,095,497 | B1 | * | 8/2015 | Prince ................... A61J 7/02 |
| 2007/0278122 | A1 | * | 12/2007 | McCumber ....... B65D 81/3294 206/514 |
| 2009/0272141 | A1 | * | 11/2009 | Heger ................... F25C 1/10 62/351 |
| 2012/0152797 | A1 | * | 6/2012 | Gross ................... B65D 1/34 206/557 |
| 2016/0000656 | A1 | * | 1/2016 | Devita .................. A61J 7/02 222/156 |

* cited by examiner

POUR TRAY

CROSS-REFERENCE TO RELATED APPLICATION

This application is related to and claims priority to U.S. Provisional Patent Application Ser. No. 62/331,128, filed May 3, 2016, entitled POUR TRAY, the entirety of which is incorporated herein by reference.

STATEMENT REGARDING FEDERALLY SPONSORED RESEARCH OR DEVELOPMENT n/a

TECHNICAL FIELD

The present invention relates to a liquid distribution and metering tray, and in particular, a pour tray for a liquid freezing machine.

BACKGROUND

When serving alcohol to patrons at establishments, such as a bars and restaurants, measuring the amount of alcohol to include in an alcoholic beverage presents numerous challenges. While metered alcohol dispensers exist that are placed on top of a bottle of alcohol, such dispensers are often disabled or removed by servers for pours that are larger than the predetermined metered amount, thus resulting in frequent alcohol spills. Such spills are wasteful and result in bar owners losing the ability to accurately track the sales, inventory, and alcohol consumption attributable to patrons.

SUMMARY

A liquid pour tray is provided including a plurality of liquid retaining receptacles in fluid communication with each other and sized to retain substantially a same predetermined volume of liquid, each of the plurality of liquid retaining receptacles including a proximal portion and a distal portion extending away from the proximal portion, the distal portion being tapered in a direction away from the proximal portion. A plurality of partitions are disposed between each of the plurality of liquid retaining receptacles. The plurality of partitions taper inwardly in a direction away from the distal portion of the plurality of liquid retaining receptacles. A ledge is disposed proximal to the plurality of liquid retaining receptacles and spans substantially a length of the tray and an overflow reservoir is disposed proximal to the ledge.

In another aspect of this embodiment, the plurality of liquid retaining receptacles includes four receptacles each sized to retain a volume of approximately 0.25 fluid ounces of liquid.

In another aspect of this embodiment, the plurality of partitions includes a first partition, a second partition, and a third partition, the second partition including a width larger than a width of the first partition and the third partition.

In another aspect of this embodiment, the plurality of liquid retaining receptacles includes four liquid retaining receptacles, and the second partition is interposed between two pairs of the plurality of liquid retaining receptacles.

In another aspect of this embodiment, each of the plurality of partitions tapers inwardly to contact the ledge.

In another aspect of this embodiment, the distal portion of the plurality of liquid retaining receptacles is elevated with respect to the proximal portion when the tray is in an upright position.

In another aspect of this embodiment, the distal portion of the plurality of liquid retaining receptacles includes a frustroconical edge.

In another aspect of this embodiment, the distal portion of the plurality of liquid retaining receptacles includes an open end.

In another aspect of this embodiment, the liquid pour tray includes a cover sealing the plurality of liquid retaining receptacles.

In another aspect of this embodiment, the liquid pour tray includes a liquid retaining cartridge sized to fit within the plurality of liquid retaining receptacles.

In another embodiment, the liquid pour tray includes a plurality of liquid retaining receptacles each including a proximal portion and a distal portion defining an open end, the distal portion having a width narrowing in a direction opposite the proximal portion toward the open end. A plurality of partitions are interposed between the plurality of liquid retaining receptacles and an overflow reservoir in fluid communication with the plurality of liquid retaining receptacles.

In another aspect of this embodiment, the liquid pour tray includes ledge at least partially defining a liquid channel fluidly coupling the plurality of liquid receptacles to each other.

In another aspect of this embodiment, the ledge is disposed proximal to the plurality of liquid retaining receptacles, the ledge spanning substantially a length of the tray.

In another aspect of this embodiment, the open end of the plurality of liquid retaining receptacles includes a frustroconical edge.

In another aspect of this embodiment, each of the plurality of partitions tapers in a direction away from the distal portion of the plurality of liquid retaining receptacles.

In another aspect of this embodiment, the distal portion of the plurality of liquid retaining receptacles is elevated with respect to the proximal portion when the tray is in an upright position.

In another aspect of this embodiment, the plurality of partitions includes a middle partition interposed between a first outer partition and a second outer partition, the middle partition having a width greater than a width of the first and the second outer partitions.

In another aspect of this embodiment, the liquid pour tray includes a cover for sealing the plurality of liquid retaining receptacles.

In another aspect of this embodiment, the liquid pour tray includes a liquid retaining cartridge sized to fit within the plurality of liquid retaining receptacles.

In yet another embodiment, the liquid pour tray includes a plurality of liquid retaining receptacles in fluid communication with each other and sized to retain substantially a same predetermined volume of liquid. Each of the plurality of liquid retaining receptacles includes a proximal portion and a distal portion extending away from the proximal portion, the distal portion sloped at an angle with respect to the proximal portion and terminating in a frustroconical edge defining an open end. A plurality of partitions are disposed between each of the plurality of liquid retaining receptacles, each of the plurality of partitions tapering in a direction away from the distal portion of the plurality of liquid retaining receptacles. A ledge is disposed proximal to the plurality of liquid retaining receptacles and spans substantially a length of the tray, the ledge defining a liquid channel fluidly coupling the plurality of liquid receptacles to each other. An overflow reservoir is disposed proximal to the ledge and a cover seals the plurality of liquid retaining receptacles.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

As used here, relational terms, such as "first" and "second," "top" and "bottom," "front and rear," and the like, may be used solely to distinguish one entity or element from another entity or element without necessarily requiring or implying any physical or logical relationship or order between such entities or elements.

Figure 1:
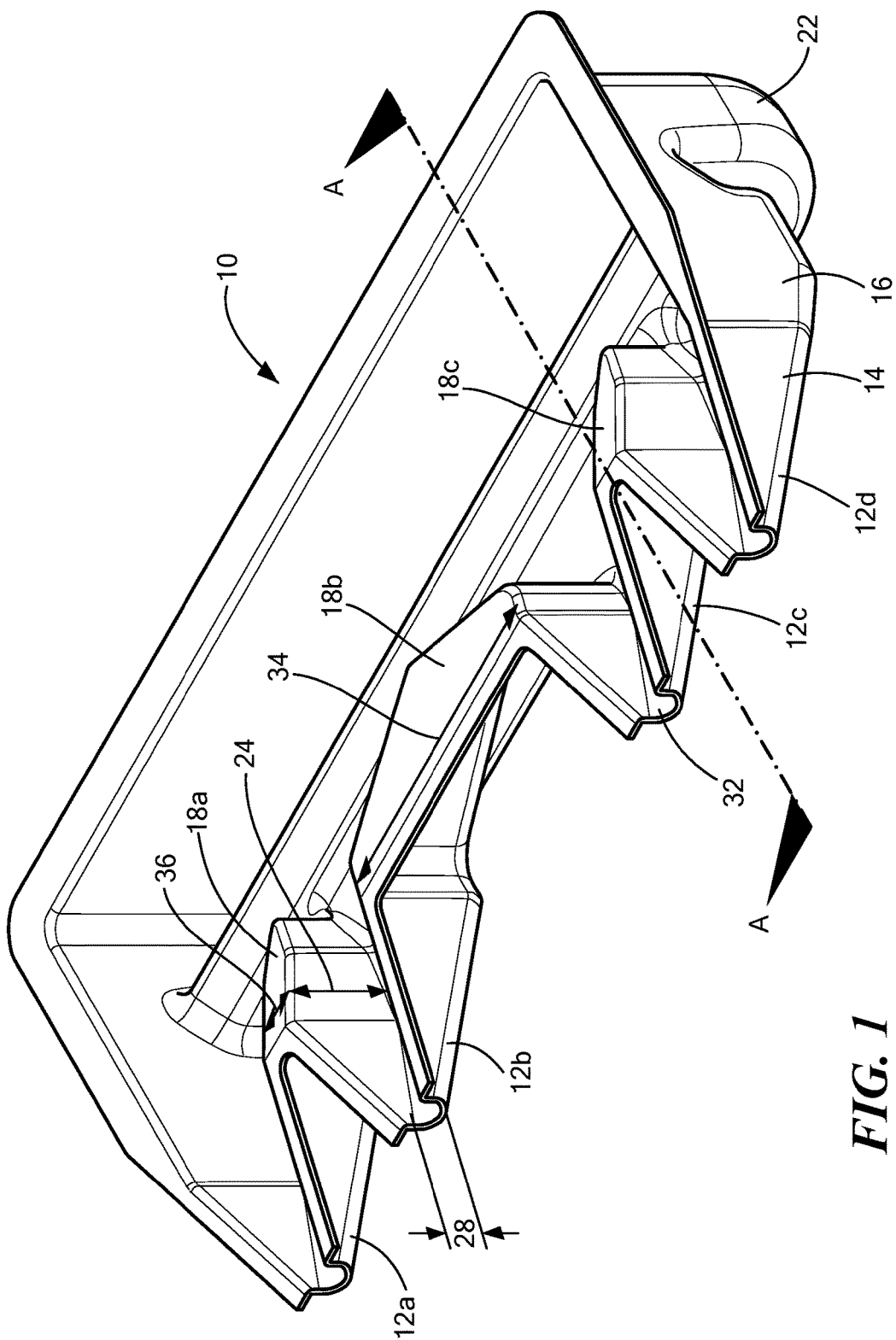
FIG. 1 is a front perspective view of an embodiment of a liquid pour tray.

Referring now to the drawings in which like reference designators refer to like elements there is shown in FIG. 1 an exemplary pour tray for liquids constructed in accordance with the principles of the application and designated generally as "10." The tray 10 may be sized to retain, distribute, and pour a predetermined amount of liquid, for example, wine, beer, spirits, mixed beverages, water, cocktail mixes, or combinations thereof. The tray 10 used to manually pour the predetermined amount of liquid or may be installed within a liquid freezing machine (not shown).

In an exemplary configuration, the tray 10 is plastic and transparent, but in other configurations may be opaque or translucent and may be composed of any material. The tray 10 may include four liquid receptacles 12 each sized to retain a predetermined volume of liquid, for example 0.25 fluid ounces. In the configuration shown in FIG. 1, four receptacles 12a-12d (referred to collective as "the receptacles 12") are included, each being sized to retain up to 0.25 fluid ounces, although any number of receptacles 12 may be included. The receptacles 12 may also be sized to retain greater than 0.25 fluid ounces.

The receptacles 12 may each define a tapered distal portion 14 to pour the liquid out from the tray 10 in the form of a stream of liquid. When the tray 10 is in a first position, i.e., an upright position, in which the liquid is retained within the receptacles 12, the tapered distal portion 14 may be elevated above a proximal portion 16 of each receptacle 12. For example, the tapered distal portion 14 may extend at an angle above the proximal portion 16 such that a retained liquid is forced down into the proximal portion 16 by gravity. In one exemplary embodiment, the angle of the tapered distal portion 14 with respect to the proximal portion 16 is approximately 35-45 degrees.

Figure 2:
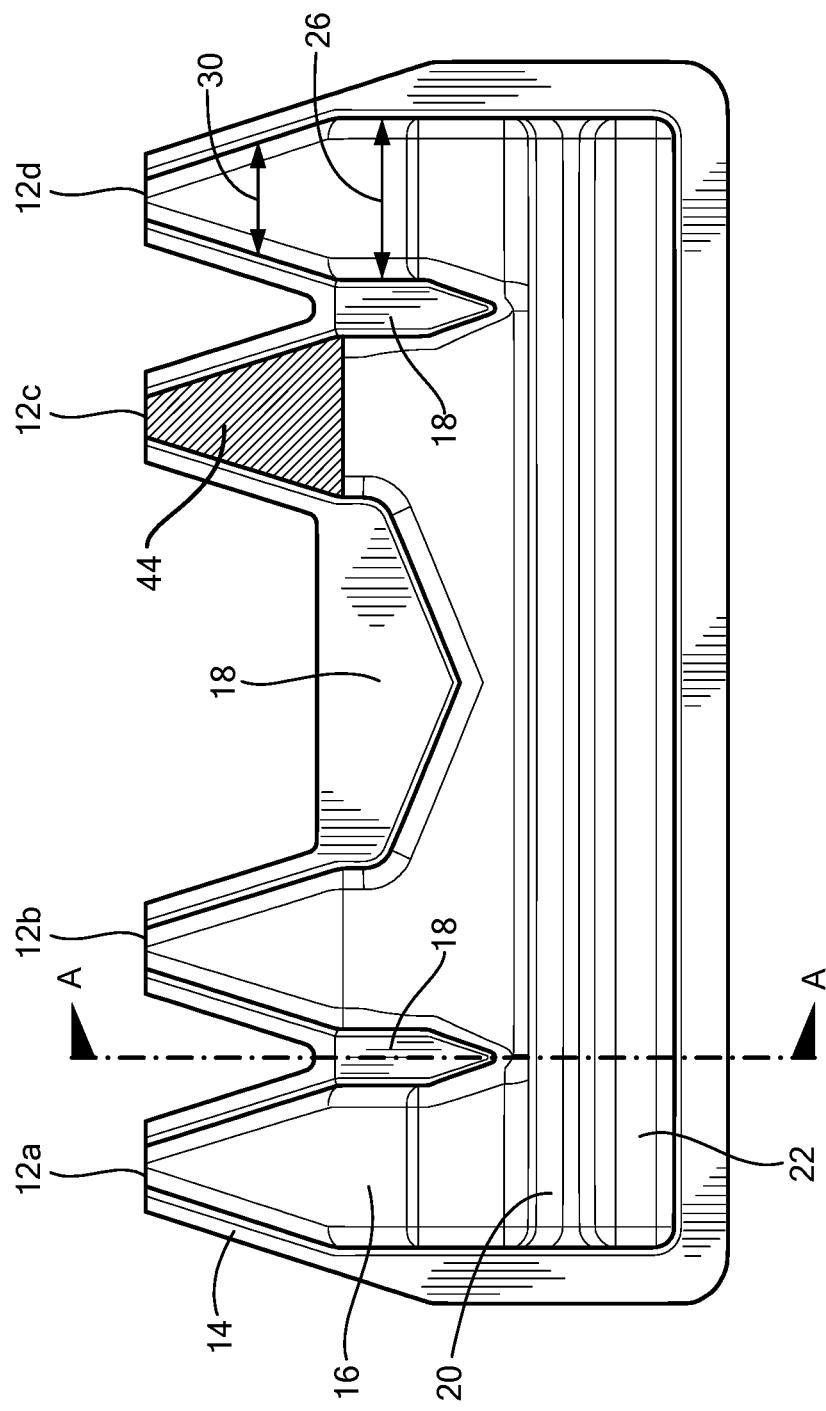
FIG. 2 is a top plan view of the liquid pour tray shown in FIG. 1.

In an exemplary configuration, as shown in FIG. 1 in conjunction with FIG. 2, the proximal portion 16 of the receptacle defines a first height 24 and a first width 26, each of which may be substantially constant across the volume defined by the proximal portion 16. The distal portion 14 includes a second height 28 and a second width 30 which gradually decrease with respect to the first height 24 and the first width 26 as the distal portion 14 extends away from the proximal portion 16. Said another way, the distal portion 14 is tapered in a direction away from the proximal portion 16. In other configurations, the distal portion 14 and the proximal portion 16 may have substantially the same height and width.

In the configuration shown in FIG. 1, the liquid retaining receptacles 12 may be substantially triangular in cross-section to funnel a volume of liquid toward the distal portion 14 when the tray 10 is pivoted from the first position in which the liquid is retained within the receptacles 12 to a second position, i.e., a pouring position, in which the liquid is poured from the receptacles 12. The distal portion 14 of the receptacles 12 defines an open distal end 32, which although shown as frustroconical in shape, may be in any shape to allow for a wider or narrower pour of liquid out of the receptacles 12. For example, clipping or cutting the distal ends 32 of the receptacles 12 to define the frustroconical shape provides for a particularly funneled liquid flow out of the receptacles 12.

Continuing to refer to FIG. 1, three partitions 18, such as a first outer partition 18a, a middle partition 18b, and a second outer partition 18c (referred to collective as "the partitions 18"), may be included as part of the tray 10 and configured to distribute liquid within the tray 10. The tray 10 may include more or less than three partitions. The partitions 18 direct liquid into a corresponding one of the liquid retaining receptacles 12.

In one configuration, the middle partition 18 is disposed at approximately a center of the tray 10 and defines a width 34 greater than a width 36 of the first and second outer partitions 18. When four liquid retaining receptacles 12 are included, two of the four receptacles 12 are disposed on opposite sides of the middle partition 18b. In an exemplary configuration, each of the partitions 18 taper in width as they extend proximally to distribute the liquid poured into the tray 10 into a corresponding one of the receptacles 12. Thus, when liquid is poured into the tray 10 from a position substantially centered above the tray 10, the middle partition 18b directs liquid into the receptacles 12b-12c. As the receptacles 12b-12c are filled to a maximum predetermined volume of liquid, liquid flows around the outer partitions 18a,18c and fills the receptacles 12a,12d. Any overflow of liquid exceeding the maximum predetermined volume of liquid to be retained in the receptacles 12, flows into an overflow reservoir 22, as discussed in detail below.

In one exemplary configuration, as shown in FIG. 2, a liquid retaining cartridge 44 may be provided which is sized to fit within the receptacle 12. The liquid retaining cartridge 44 contains a seal for sealing a premeasured volume of liquid within the liquid retaining cartridge 44. For example, the liquid retaining cartridge 44 may include wine, beer, spirits, mixed beverages, water, cocktail mixes, or combinations thereof. The seal may be removed from the liquid retaining cartridge 44 so that the premeasured volume of liquid sealed therein can be poured out of the distal portion 14 of the receptacle 12.

Figure 3:
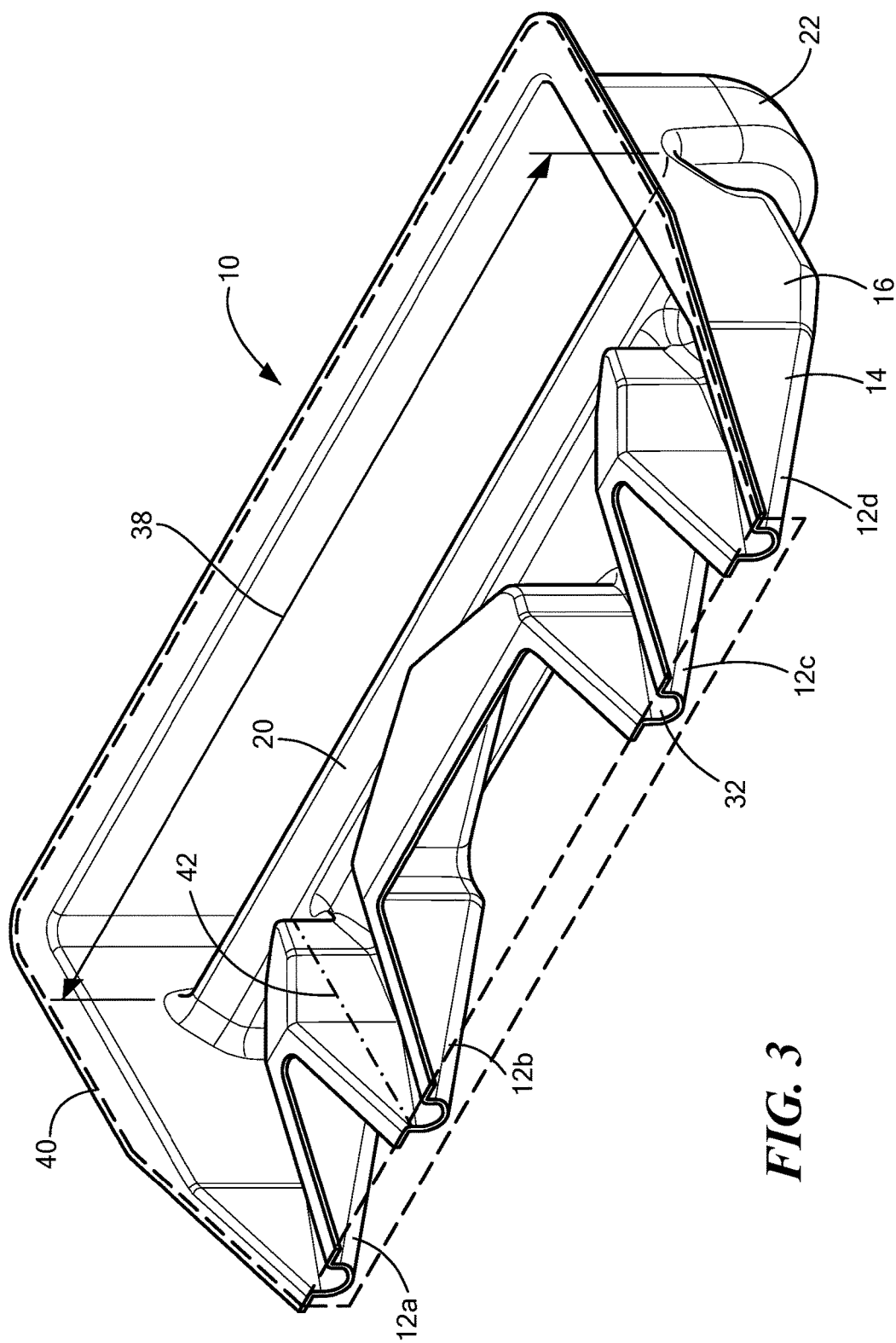
FIG. 3 is a front perspective view of the liquid pour tray shown in FIG. 1 including a cover.
Figure 4:
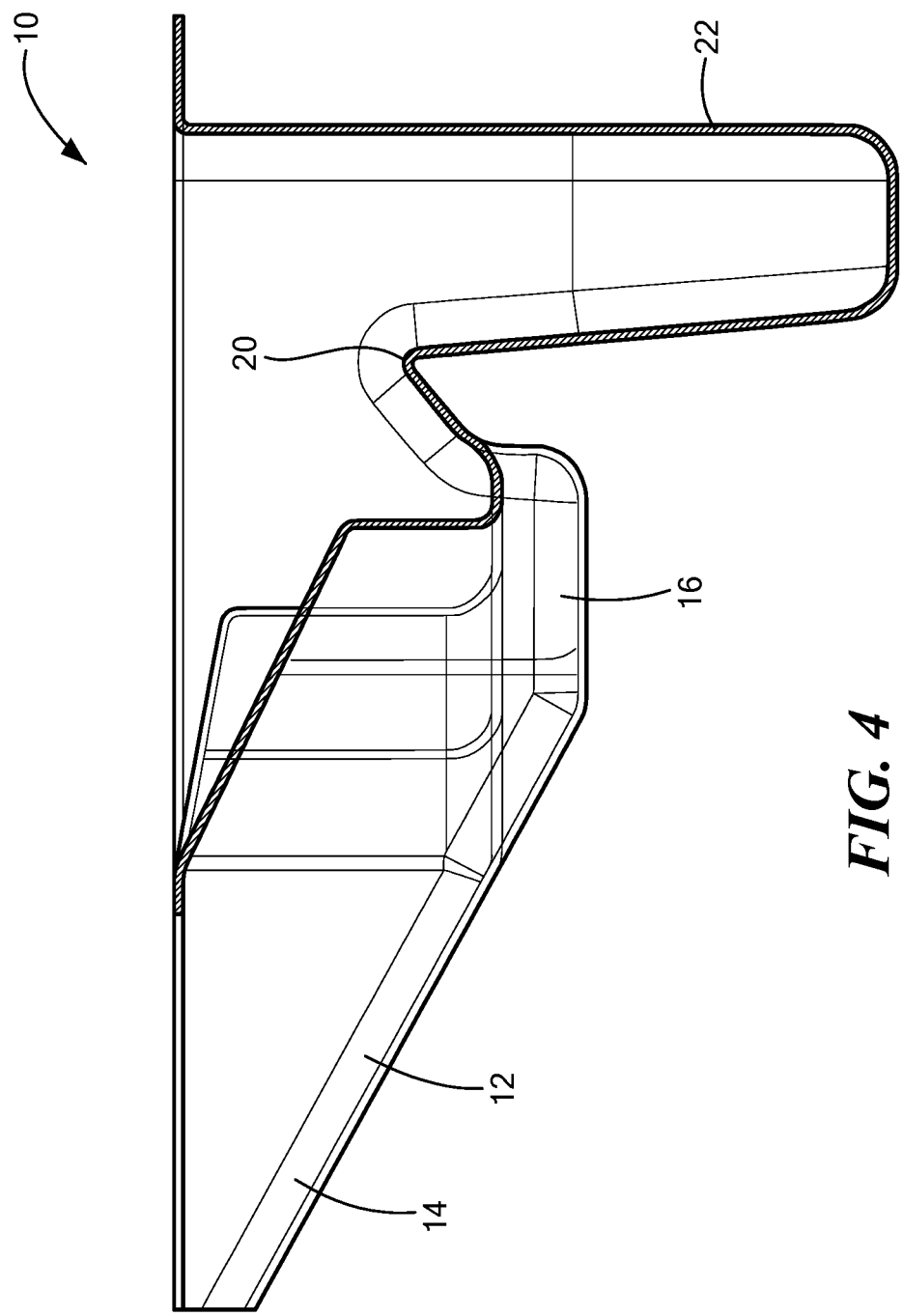
FIG. 4 is a side cross-sectional view of the pour tray shown in FIGS. 1 and 2 taken along section A-A of FIGS. 1 and 2.

Referring now to FIGS. 3 and 4, a perspective view of the tray 10 and a cross-sectional view of the tray taken across section A-A of FIGS. 1 and 2 are depicted, respectively. More specifically, disposed proximal to the receptacles 12 and the partitions 18 is a ledge 20 spanning substantially the entire length 38 of the tray 10. The ledge 20 is raised above the bottom of the proximal portion 16 of each receptacle 12 and may be angled away from each receptacle 12 such that fluid within each receptacle 12 is retained within each receptacle until a predetermined volume is reached. For example, as liquid is poured into each receptacle 12, liquid begins to climb up along a surface of the ledge 20. When the maximum predetermined volume of liquid within the receptacles 12 is reached, the volume of liquid exceeds the height of the ledge 20 and begins to flow into a reservoir 22 positioned proximal to the ledge 20. Thus, the ledge 20 provides a boundary to ensure that only the predetermined volume of liquid is retained within each receptacle 12 and any additional liquid poured into the receptacles 12 flows into the reservoir 22. The liquid within the reservoir 22 may then be poured back into a reservoir or bottle, for example, a bottle of alcohol, to be used for future consumption without waste.

When the volume of liquid within the tray 10 is less than the height of the ledge 20, the partitions 18 taper inwardly to contact the ledge 20 and facilitate the flow of liquid toward the distal portion 14 of the receptacles 12. A fill line 42 (as illustrated in FIG. 3) may be provided to mark the maximum predetermined volume of liquid. In one exemplary embodiment, such as when the tray is translucent, the fill line 42 may be illuminated with an LED light to provide for an accurate manual pour of liquid.

In another configuration, as depicted in FIG. 3, the tray 10 may include a cover 40 to seal the liquid within the receptacles 12. The cover 40 may be a flip-top cover coupled to the tray 10 using a hinge, a plastic wrap, or another suitable type of cover 40 configured to seal liquid within the receptacles 12. In another exemplary configuration, the distal end 14 of the receptacle 12 may include a tear strip, may be punctured, or may include a removable tab that allows liquid to flow out of the distal portion 14 of the receptacle 12.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention.

What is claimed is:

1. A tray comprising:
    a plurality of liquid retaining receptacles in fluid communication with each other and sized to retain substantially a same predetermined volume of liquid, each of the plurality of liquid retaining receptacles including a proximal portion and a distal portion extending away from the proximal portion, the distal portion being tapered in a direction away from the proximal portion;
    a plurality of partitions disposed between each of the plurality of liquid retaining receptacles, the plurality of partitions tapering inwardly in a direction away from the distal portion of the plurality of liquid retaining receptacles;
    a ledge disposed proximal to the plurality of liquid retaining receptacles and spanning substantially a length of the tray; and
    an overflow reservoir disposed proximal to the ledge.

2. The tray according to claim 1, wherein the plurality of liquid retaining receptacles includes four receptacles each sized to retain a volume of approximately 0.25 fluid ounces of liquid.

3. The tray according to claim 1, wherein the plurality of partitions includes a first partition, a second partition, and a third partition, the second partition including a width larger than a width of the first partition and the third partition.

4. The tray according to claim 3, wherein the plurality of liquid retaining receptacles includes four liquid retaining receptacles, and the second partition is interposed between two pairs of the plurality of liquid retaining receptacles.

5. The tray of claim 1, wherein each of the plurality of partitions tapers inwardly toward the ledge.

6. The tray of claim 1, wherein the distal portion of the plurality of liquid retaining receptacles is elevated with respect to the proximal portion when the tray is in an upright position.

7. The tray of claim 1, wherein the distal portion of the plurality of liquid retaining receptacles includes a frustroconical edge.

8. The tray of claim 1, wherein the distal portion of the plurality of liquid retaining receptacles includes an open end.

9. The tray of claim 1, further comprising a cover sealing the plurality of liquid retaining receptacles.

10. The tray of claim 1, further comprising a liquid retaining cartridge sized to fit within at least one of the plurality of liquid retaining receptacles.

11. A liquid pour tray, comprising:
    a plurality of liquid retaining receptacles each including a proximal portion and a distal portion defining an open end, the distal portion having a width narrowing in a direction opposite the proximal portion toward the open end;
    a plurality of partitions interposed between the plurality of liquid retaining receptacles; and
    an overflow reservoir in fluid communication with the plurality of liquid retaining receptacles.

12. The liquid pour tray of claim 11, further comprising a ledge at least partially defining a liquid channel fluidly coupling the plurality of liquid receptacles to each other.

13. The liquid pour tray of claim 12, wherein the ledge is disposed proximal to the plurality of liquid retaining receptacles, the ledge spanning substantially a length of the tray.

14. The liquid pour tray of claim 11, wherein each open end of the distal portion of the plurality of liquid retaining receptacles includes a frustroconical edge.

15. The liquid pour tray of claim 11, wherein each of the plurality of partitions tapers in a direction away from the distal portion of at least one of the plurality of liquid retaining receptacles.

16. The liquid pour tray of claim 11, wherein the distal portion of at least one of the plurality of liquid retaining receptacles is elevated with respect to the proximal portion when the tray is in an upright position.

17. The liquid pour tray of claim 11, wherein the plurality of partitions includes a middle partition interposed between a first outer partition and a second outer partition, the middle partition having a width greater than a width of the first and the second outer partitions.

18. The liquid pour tray of claim 11, further comprising a cover for sealing the plurality of liquid retaining receptacles.

19. The liquid pour tray of claim 11, further comprising a liquid retaining cartridge sized to fit within at least one of the plurality of liquid retaining receptacles.

20. A liquid pour tray comprising:
    a plurality of liquid retaining receptacles in fluid communication with each other and sized to retain substantially a same predetermined volume of liquid, each of the plurality of liquid retaining receptacles including a proximal portion and a distal portion extending away from the proximal portion, the distal portion sloped at an angle with respect to the proximal portion and terminating in a frustroconical edge defining an open end;

a plurality of partitions disposed between each of the plurality of liquid retaining receptacles, each of the plurality of partitions tapering in a direction away from the distal portion of the plurality of liquid retaining receptacles;

a ledge disposed proximal to the plurality of liquid retaining receptacles and spanning substantially a length of the tray, the ledge defining a liquid channel fluidly coupling the plurality of liquid receptacles to each other;

an overflow reservoir disposed proximal to the ledge; and a cover sealing the plurality of liquid retaining receptacles.

* * * * *